US009764503B2

(12) United States Patent
Seto

(10) Patent No.: US 9,764,503 B2
(45) Date of Patent: Sep. 19, 2017

(54) APPARATUS FOR MAKING EDIBLE CONTAINERS

(71) Applicant: Rex Seto, Toronto (CA)

(72) Inventor: Rex Seto, Toronto (CA)

( * ) Notice: Subject to any disclaimer, the term of this patent is extended or adjusted under 35 U.S.C. 154(b) by 212 days.

(21) Appl. No.: 14/436,012

(22) PCT Filed: Oct. 15, 2013

(86) PCT No.: PCT/CA2013/050782
§ 371 (c)(1),
(2) Date: Apr. 15, 2015

(87) PCT Pub. No.: WO2014/059543
PCT Pub. Date: Apr. 24, 2014

(65) Prior Publication Data
US 2015/0258717 A1    Sep. 17, 2015

Related U.S. Application Data

(60) Provisional application No. 61/714,087, filed on Oct. 15, 2012.

(51) Int. Cl.
*B29C 43/52*        (2006.01)
*A47J 43/20*        (2006.01)
(Continued)

(52) U.S. Cl.
CPC .............. *B29C 43/52* (2013.01); *A21B 3/13* (2013.01); *A21B 5/026* (2013.01); *A21C 11/006* (2013.01);
(Continued)

(58) Field of Classification Search
CPC .. A21B 5/026; A21B 5/02; A21B 3/13; A21B 3/132; A21C 11/006; A21C 15/025;
(Continued)

(56) References Cited

U.S. PATENT DOCUMENTS 2,156,145 A * 4/1939 Cavett .................... A23G 3/566
426/138
3,296,956 A * 1/1967 Turner ................... A21B 5/026
249/125

(Continued)

OTHER PUBLICATIONS

International Search Report, PCT/CA2013/050782, Rex Seto, Feb. 7, 2014, 3 pages.

(Continued)

*Primary Examiner* — Alison L Hindenlang
*Assistant Examiner* — Jerzi H Moreno Hernandez
(74) *Attorney, Agent, or Firm* — Hill & Schmacher

(57) ABSTRACT

The present disclosure provides an apparatus for making edible containers which includes a hollow female mold for holding a flowable food product and a male mold insertable into the hollow female mold. The two molds when assembled define a gap of preselected thickness so that when assembled with the food product in the female mold, the gap is filled with the food product in the shape of the final edible container produced once the food product is cooked or baked. An alignment and positioning mechanism is provide that keeps the two mold sections aligned but allows them to move with respect to each other during heating so that when the food product expands, the two molds can move with respect to each other while still keeping the two mold sections aligned with each other so the final edible container keeps its same general shape before and after cooking.

7 Claims, 9 Drawing Sheets

(51) Int. Cl.
*A21B 5/02* (2006.01)
*A21B 3/13* (2006.01)
*A21C 11/00* (2006.01)
*A47J 37/01* (2006.01)
*A21C 15/02* (2006.01)
*A23G 3/56* (2006.01)
*A21D 13/33* (2017.01)
*A21D 13/48* (2017.01)
*B29L 31/00* (2006.01)

(52) U.S. Cl.
CPC ............ *A21C 15/025* (2013.01); *A21D 13/33* (2017.01); *A21D 13/48* (2017.01); *A23G 3/566* (2013.01); *A47J 37/01* (2013.01); *A47J 43/20* (2013.01); *B29L 2031/712* (2013.01)

(58) Field of Classification Search
CPC  A47J 37/01; A47J 43/20; B29C 39/34; B29C 39/26; B29C 33/302; B29C 44/583; B29C 44/588; B29C 51/082; B29C 33/76; B29C 33/303; B29C 33/304; B65D 65/463; A23G 3/566; A21D 13/33; A21D 13/48; B29L 2031/712
See application file for complete search history.

(56) References Cited

U.S. PATENT DOCUMENTS

| | | | |
|---|---|---|---|
| 3,800,054 A | * | 3/1974 | Giesfeldt ........... B65D 77/0493 |
| | | | 426/138 |
| 5,191,830 A | | 3/1993 | Jacobson |
| 5,298,273 A | * | 3/1994 | Ito .......................... A21B 5/026 |
| | | | 426/138 |
| 5,425,527 A | | 6/1995 | Selbak |
| 7,513,767 B2 | * | 4/2009 | Caboverde .............. A23L 19/03 |
| | | | 425/318 |
| 7,895,940 B2 | | 3/2011 | Huxel et al. |
| 2012/0003363 A1 | | 1/2012 | Beloff |
| 2012/0244250 A1 | | 9/2012 | Bartolucci et al. |

OTHER PUBLICATIONS

Written Opinion, PCT/CA2013/050782, Rex Seto, Feb. 7, 2014, 4 pages.

* cited by examiner

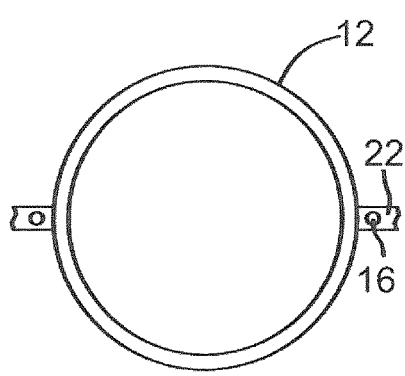
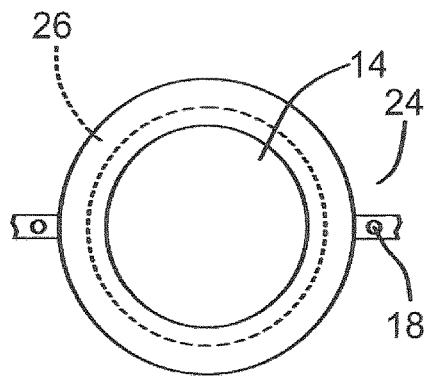
FIG. 10  FIG. 11
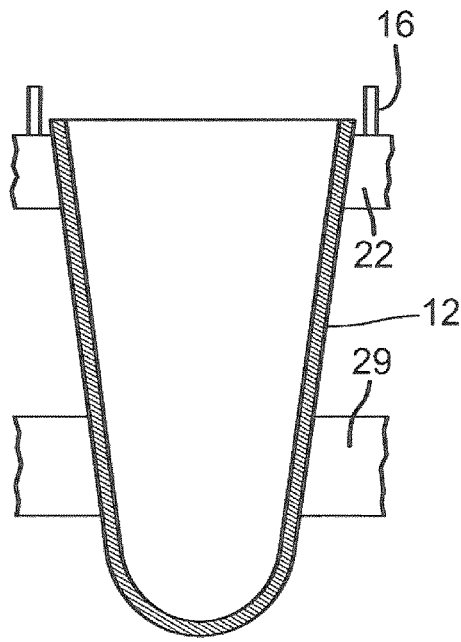
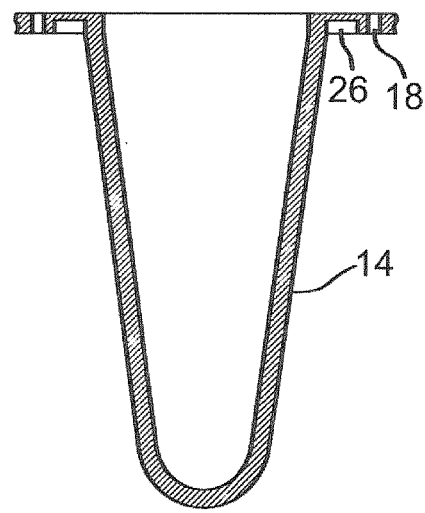
FIG. 12  FIG. 13

APPARATUS FOR MAKING EDIBLE CONTAINERS

CROSS-REFERENCE TO RELATED APPLICATIONS

This application is a National Phase application claiming the benefit of the international PCT Patent Application No. PCT/CA2013/050782, filed on Oct. 15, 2013, in English, which claims priority to U.S. Provisional Application No. 61/714,087, filed on Oct. 15, 2012, the entire contents of which are incorporated herein by reference.

FIELD

The present disclosure relates to an apparatus and method for making edible containers. In particular, the present disclosure relates to an apparatus and method for making edible food containers having a pocket or cavity formed therein. The present disclosure also relates to a method for filling the edible food container.

BACKGROUND

The making of edible bread containers have been in existence for a very long time. People have wrapped all sorts of foodstuffs in pliable flatbreads for centuries. As well small loaves have been sliced open or hollowed out in order to be filled with a variety of foodstuffs. These breads in effect serve to transport and contain food.

All of the above attempts have serious disadvantages. In the case of the wraps made out of flatbreads, it takes a minimum of 3 folds to achieve a tube like structure capable of containing food. However these folds still represent open seams where leakage is always a possibility. Also, certain areas in particular the bottom the wrap is several layers thick, resulting in mouthfuls of bread without any filling. Furthermore, as the bread is being eaten, the structural integrity of the tube is compromised and the contained food substances often end up in places other than the mouth.

Simply slicing a loaf of bread requires at least 3 surfaces to be cut before the bread can be opened. These are open seams for food to fall out. Consider also that since there is no cavity for the filling, the gap between the sliced bread is even wider. As well, the interior of the bread is more soft and absorbent so it provides less moisture resistance. Hollowing out the loaf may alleviate some of the aforementioned problems but it will require time, skill and a very good idea of what to do with the scrap bread.

Most edible containers being produced requires that the dough be made into flat sheets which are then cut into predetermined shapes prior to having them cooked on some supporting framework or molds. These techniques are successful in producing relatively stiff and brittle containers (ice cream cones, tacos, etc.) bearing little resemblance to bread.

Furthermore, loaf breads are made generally made by baking leavened dough on a bread pan that may or may not have walls but definitely it will have an open top. The exposed part of the dough during baking allows not only for the moisture and other gasses to escape but also for the formation of the characteristics (caramelization, color, crunchiness, etc.) of the particular crust as determined by the dough recipe. Lastly the dough is free from any compression forces preventing the loaf to rise and expand.

There are some patents that propose the use of bread dough for producing edible containers.

U.S. Pat. No. 4,656,935 describes an apparatus and method to produce oval boat-shaped buns with a central depression designed specifically for an open faced sandwich.

U.S. Pat. No. 4,313,964 uses a female form and a male form that are locked together during the cooking process with a vent port on either of the male or female form. A vent was placed at the apex of the male form to allow for the release of gases and excess dough but this vent is inadequate for gas release. It may in fact create a defect in the eventual cone at the worst possible location, its bottom. Another problem the vent poses is that during compression to coax the dough into the cone shaped cavity, the dough will more likely escape through this vent.

U.S. Pat. No. 5,336,511 describes a technique using two male molds, a forming one and a cooking one in conjunction with a female mold. The dough is first, partially cooked with the female and the male forming molds together. At this point the source of heat is from the female mold only. The male forming mold is then replaced by a heated male cooking mold and the rest of the cooking of the resultant cone is completed with both forms in place. Again this method like the previously described one fails to prevent compression of the bread during cooking and also fails to provide adequate venting of moisture.

U.S. Pat. No. 7,895,940 uses one female form and two male forms (namely, a heated mandrel and a baking insert). The method involves inserting the heated mandrel into the female form holding the dough bolus, to partially cook and to partially form the cone shape. The partially cooked dough is to retain enough of a self-supporting shape to allow the heated mandrel to be removed and replaced by the baking insert, as shown in their FIG. 6. In this case, the guide pins with the wing nuts serve to centre the baking insert relative to the female form as well as to hold the insert off the female form to create the space for the dough to expand and for vapors to escape. The wing nuts serve to place an upper limit to the vertical movement of the insert. This is supposed to encourage the uncooked dough to expand up the sides during the final baking phase to form the shape of the end product. This, however, may be a rather haphazard means of producing the final dimension of the end product. For example, the initial partly formed cone may be torn apart during the final baking as the uncooked dough is forced up the sides. This continuous movement during the cooking process may result in the formation of various cracks, fissures and other open seams in the bread.

Therefore, it would be beneficial to provide a more uniform and consistent food container having a substantially seamless cavity (or cavities), and having less cracks and fissures. Accordingly, the present disclosure is related to a more efficient, yet simpler apparatus and method for creating edible food containers out of bread.

SUMMARY

The present disclosure provides an apparatus for making edible containers which includes a hollow female mold for holding a flowable food product and a male mold insertable into the hollow female mold. The two molds when assembled define a gap of preselected thickness so that when assembled with the food product in the female mold, the gap is filled with the food product in the shape of the final edible container produced once the food product is cooked or baked. An alignment and positioning mechanism is provide that keeps the two mold sections aligned but allows them to move with respect to each other during heating so that when the food product expands, the two molds can move with respect to each other while still keeping the two mold sections aligned with each other so the final edible container keeps its same general shape before and after cooking. Thus, an embodiment of an apparatus for making an edible container, comprises:

at least one female mold having a hollow body and an entrance into the hollow body;

at least one male mold having a body with a first end portion adapted for insertion into the hollow body of the female mold and a second end located exterior to the hollow body when the first end portion is inserted into the hollow body, the at least one female mold and the at least one male mold having a shape and size such when the at least one male mold is inserted into the at least one female mold, a gap of preselected width is formed between an inner surface of the hollow body of the female mold and an outer surface of the male mold;

an alignment and positioning mechanism for aligning the at least one female mold and the at least one male mold for assembling the at least one female mold and the at least one male mold together; and wherein in operation, a flowable food product is placed into the hollow body of the female mold, and upon aligning and positioning the at least one male mold the male mold is inserted into the at least one female mold whereupon the at least one male mold displaces the flowable food product between the at least one female and male mold with the flowable food product located in the gap for defining a wall thickness of an edible container formed by heating the flowable food product located in the gap, and wherein, and wherein the alignment and positioning mechanism is configured to permit unrestricted movement of the at least one male and female molds with respect to each other while maintaining an alignment between the at least one male mold and the at least one female mold upon heating and expansion of the flowable food product.

A further understanding of the functional and advantageous aspects of the disclosure can be realized by reference to the following detailed description.

BRIEF DESCRIPTION OF DRAWINGS

The following is a description of the apparatus for making edible containers, reference being had to the accompanying drawings, in which:

FIG. 10 is a top view of one embodiment of a female mold;

FIG. 11 is a top view of one embodiment of a male mold;

FIG. 12 is a side view of one embodiment of a female mold;

FIG. 13 is a side view of one embodiment of a male mold;

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present disclosure. For purposes of teaching and not limitation, the illustrated embodiments are directed to apparatuses and methods for making edible containers having a cavity or cavities formed therein.

Figure 1:
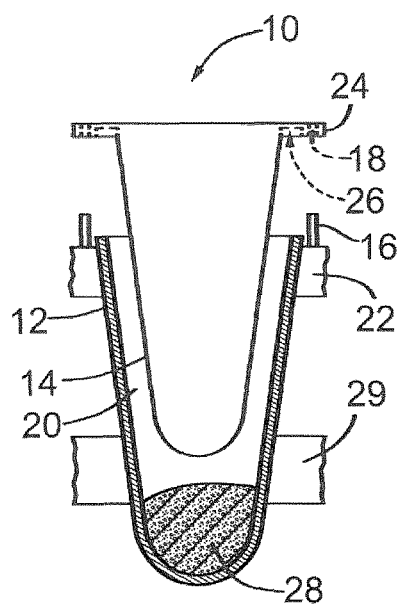
FIG. 1 is a sectional view of an apparatus according to the present disclosure wherein a predetermined amount of dough has been placed in the outer mold (hereinafter, also referred to as a female mold), and also showing an inner mold (hereinafter, also referred to as a male mold) partially inserted.
Figure 2:
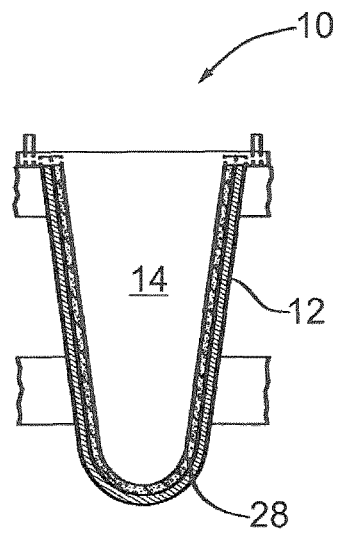
FIG. 2 is a sectional view of an apparatus according to the present disclosure wherein the male mold is completely inserted within the female mold.
Figure 3:
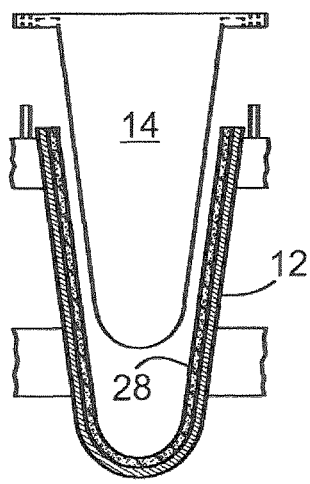
FIGS. 3 to 9 are views showing one embodiment of cooking process.

Referring to FIG. 1, an apparatus for making a flatbread container having a cavity according to one embodiment of the present disclosure is shown at 10. The apparatus 10 has a female form 12 with the interior in the shape of a cone with the smaller diameter forming the bottom and ends in a dome. The larger diameter will be the top and will form the opening. If desired, non-stick coatings and other releasing agents may be used.

The apparatus 10 includes a hollow male form 14 whose exterior shape mirrors that of the interior of the female form 12 such that when the two forms 12 and 14 are assembled as facilitated by the guide pins 16 and their corresponding holes 18, there is a resultant pre-specified volume 20 formed between forms 12 and 14. The apparatus 10 includes flanges 22 and 24, extending outwardly from female form 12 and male form 14, respectively, and the guide pins 16 and their corresponding holes 18 are formed in the flanges 22 and 24, respectively, with flange 22 being located at the top of the female form 12 and flange 24 being located at the top of male form 14. The guide pins 16 centre the male form 14 relative to that of the female 12 and allows movement in the vertical direction while keeping the two molds aligned with each other. More specifically, the guide pins 16 serve to centre the male form 14 with respect to the female form 12 to shape and form the dough as well as to maintain the shape during cooking while allowing the dough to expand. The dimension of the end product is determined by the pre-formed dough rather than by the expansive forces of cooking. It is noted that in addition to dough, the present device is useful for any flowable food product.

Figure 20:
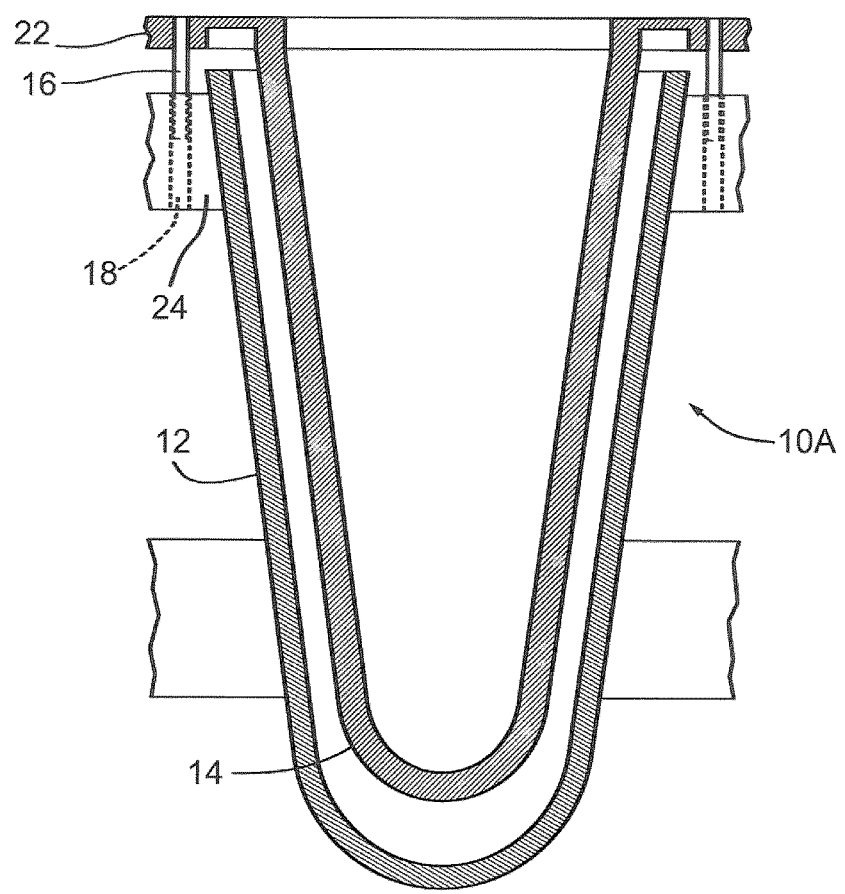
FIG. 20 is a sectional view of an alternate apparatus according to the present disclosure wherein the guide pins 16 are on the male form and their corresponding holes on the female form.

In a specific embodiment disclosed herein, the guide pins 16 are shown on the flanges 22 of the female form 12 (FIGS. 10 and 12) and their corresponding holes 18 shown on the flanges 24 of on the male form 14 (FIGS. 11 and 13). However, these can be reversed with the same effect as shown in FIG. 20, and the present disclosure is also related to such an alternative embodiment.

In one embodiment, the apparatus 10 includes a silicone o-ring 26 located in flange 24 around the upper open end of male mold 14 to allow for compression to initially form the dough into a uniform specific size and shape as well as to facilitate the removal of the excess dough prior to the cooking process. The silicone ring sits within an annular compartment around the peripheral upper opening of the of the male mold 14. Silicone o-ring is not permanently attached so that silicone rings of different thicknesses may be interchanged to accommodate the different viscosities of dough being used.

Still referring to FIG. 1, a predetermined amount of dough 28 is placed in the bottom of mold 12, which may be slightly more than the volume of the aforementioned space defined between molds 12 and 14 such that when the male form 14 is placed in position and inserted into mold 12, the dough completely fills the volume defined between the male and female molds. The excess dough may be trimmed off and returned to the dough vat for reuse.

Figure 4:
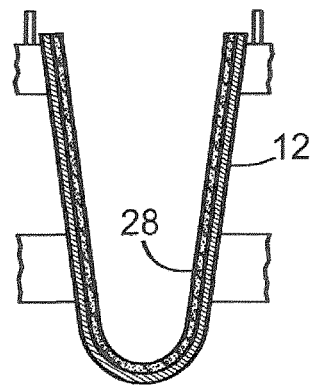
Figures 5, 6, 7:
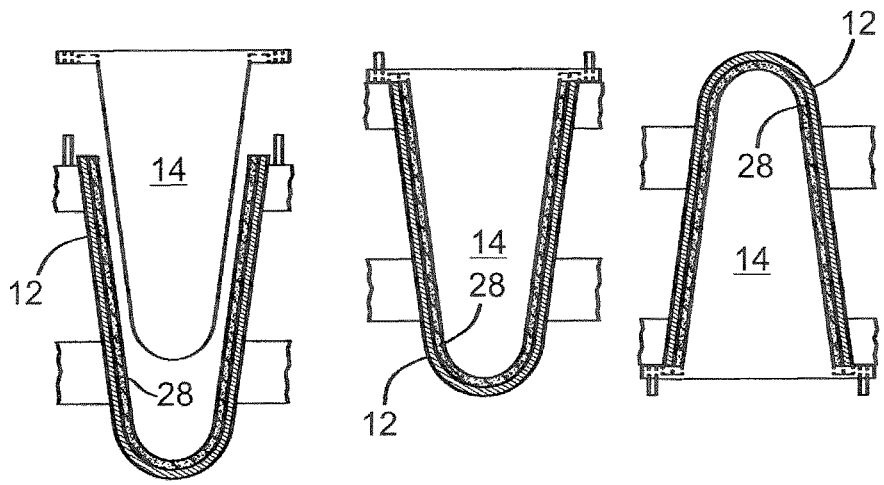

One embodiment of a process for making a flat bread container of the present disclosure are shown in FIGS. 3 to 9. The male mold 14 is lifted off to allow various gases and vapors to escape (FIG. 3), and the female mold 12 is heated to the desired cooking temperature (FIG. 4). When the bread is half cooked the male form 14 is put back in as the heat is removed from the female form 12, as shown in FIGS. 5 and 6.

Figures 8, 9:
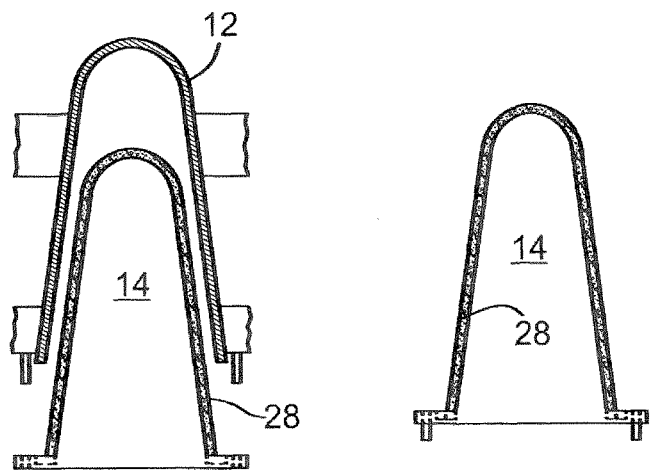

The entire mold complex including both the male and female forms 14 and 12 as well as the half cooked dough is now inverted, as shown in FIG. 7. Referring to FIGS. 8 and 9, heat is now applied to the male form 14 to finish the cooking as the female form 12 is lifted off to allow the gases and vapors to escape. The flaring conical shape of the interior of the female form 12, gravity and the optional use of non-stick coatings as well as releasing agents help ensure that all the half cooked bread stays on the male form 14. A gentle tap or a shake may also allow the half cooked bread to disengage the female form 12 and stay on the male mold 14.

Figure 14:
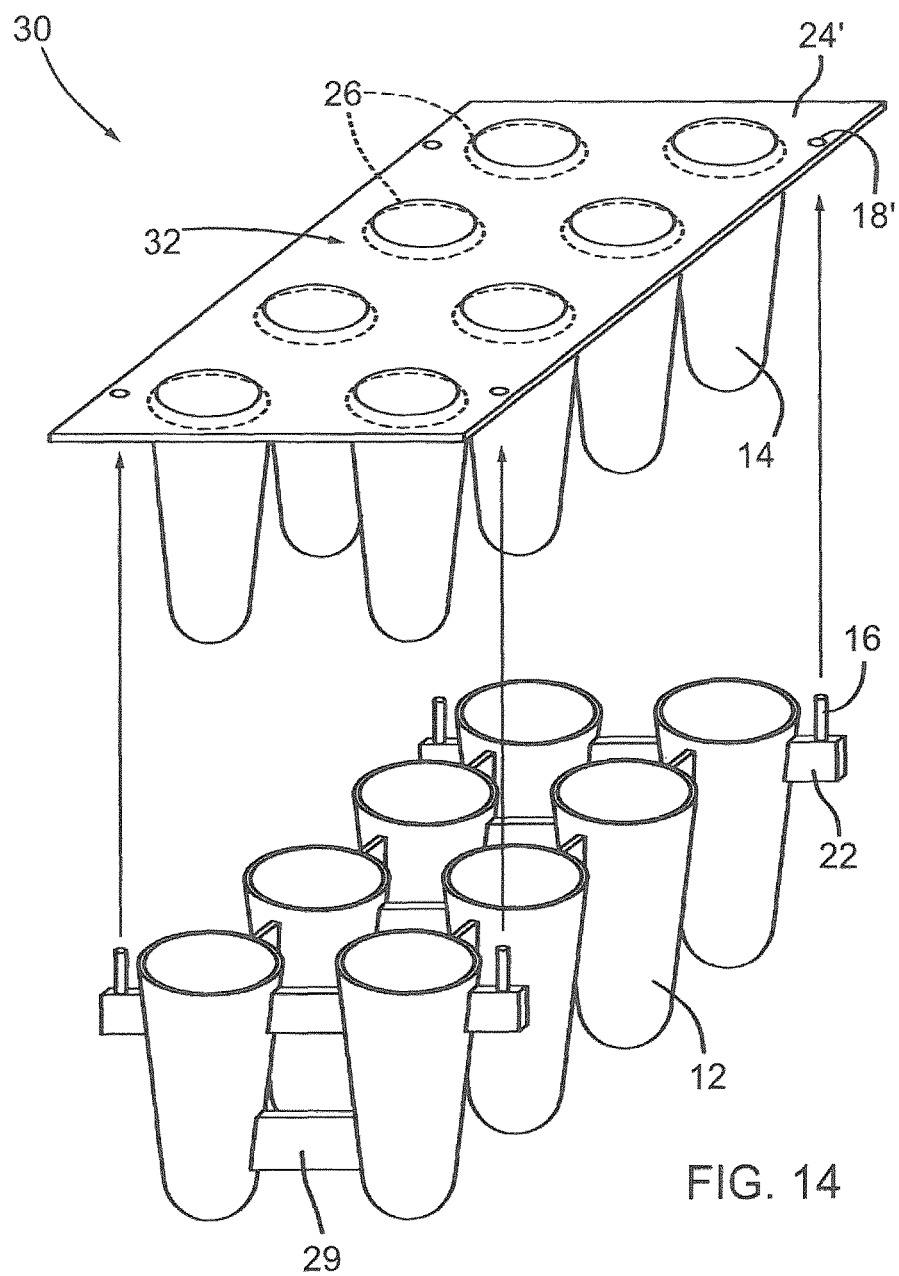
FIG. 14 is an exploded view of a set of a plurality of male and female molds.

Although the method described above involves a single male and a single female form, a plurality of these forms as well as automation can be used to make the process more cost effective. Referring to FIG. 14, one embodiment of an apparatus having a plurality or array of the female forms 12 and a plurality of the male forms 14 is shown generally at 30. In this specific embodiment, the flanges 22 on the female forms 12 at the ends of the array are provided with alignment guide pin 16 which are received into corresponding holes 18' to attach the plurality of the female molds 12 to the flange 24' of the male forms 14 In the embodiment shown in FIG. 14, the flange 24' on the male forms 14 may be in the form of one single tray 32, and the holes 18' are located at each corner of the tray 32 to receive the alignment pins 16 from the female mold flanges. Furthermore, the plurality of the female molds 12 may be provided with one of more optional fins 29 connecting the neighboring female molds near the downstream end thereof. Optional fins 29 may be present in order to provide more stability by holding the female forms 12 more securely. It will be appreciated that individual female and male mold forms 12 and 14 respectively may be configured so that any number of the molds may be attached to each other depending on the overall size of the mold array desired. Specifically, the flanges on each of the male and female molds may be shaped in such a way that they snap fit to flanges on several other molds in order to releasably attach them to each other.

As with the single molds described earlier, the cooking process may be carried out by forming the shaped dough product using the molds, then removing the female mold and cooking the dough on the male mold, or it may be reversed with the cooking carried out on the male form first followed by cooking on the female form.

Alternately the dough could be cooked with both the male and female forms in place with the heat applied evenly on both forms at the same time or on one form at a time. The alignment guide pins 16 in holes 18, 18' allow for molds 12 and 14 to move with respect to each other thus allowing the bread to rise and for vapors to vent especially when the male form 14 is removed once the cooking is completed and the female form 12 still has residual heat, or vice versa. Cooking of the dough can also be done by leaving it on either form (see FIG. 4 or FIG. 9) and baking it.

Figure 15:
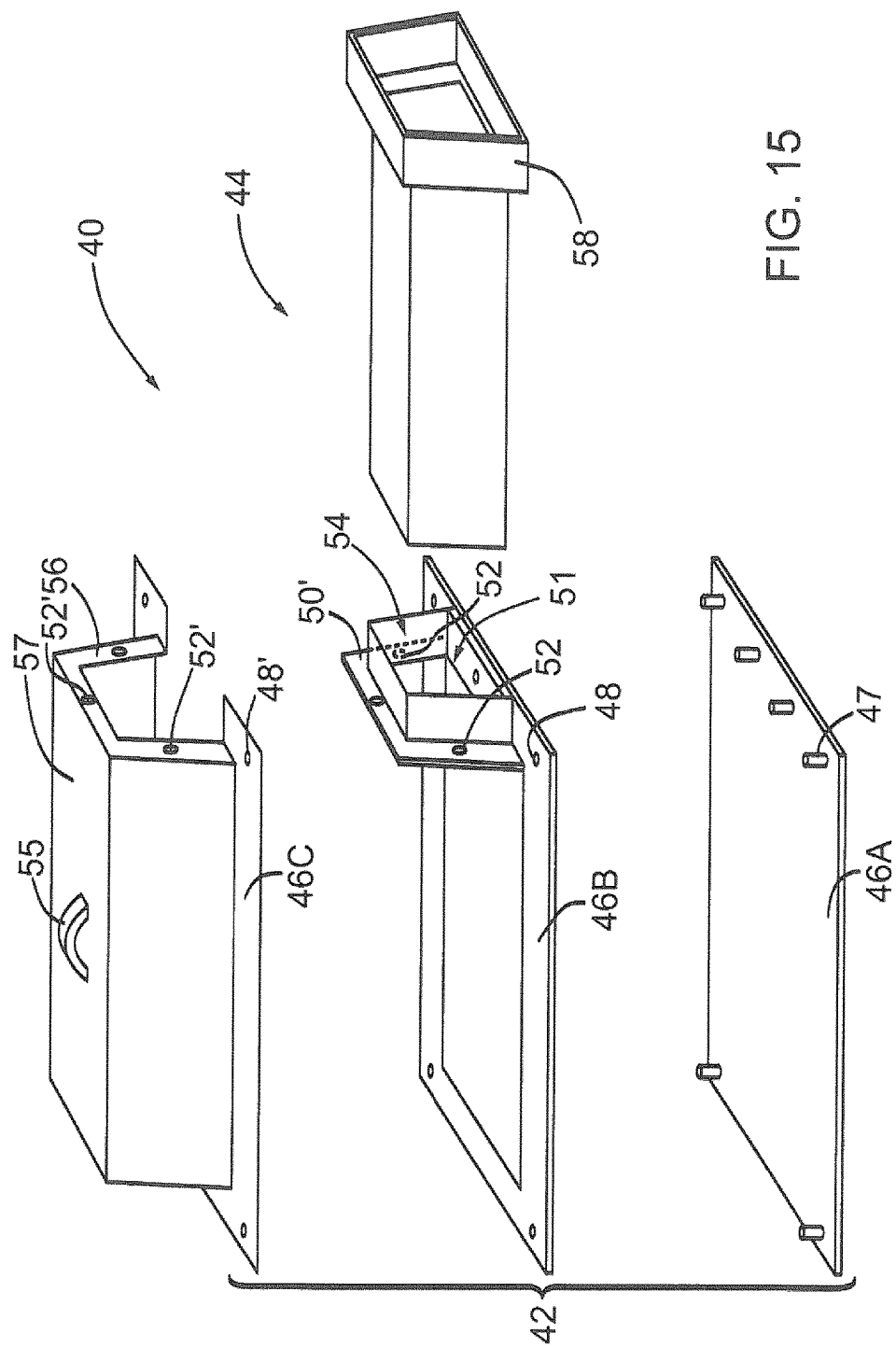
FIG. 15 is an exploded view of an apparatus according to a first alternative embodiment of the present disclosure.

The present disclosure is also directed to an apparatus for making loaf breads having a desired pocket or cavity, into which food stuff can be filled in. Referring to FIG. 15, one exemplary embodiment of such an apparatus is shown at 40. The apparatus 40 includes a female baking form or mold 42 that is comprised of three separate parts A, B and C that can come apart easily and fit together with precision and a male baking form or mold 44. In the embodiment shown in FIG. 15, parts A, B and C of the female mold 42 have flanges 46A, 46B and 46C, respectively.

The first part or part A forms the base (or the bottom of the bread) and has a pre-selected number of upright longitudinal pins 47 extending upwardly from the flange 46A. The pins 47 are of sufficient length and diameter to prevent the other pieces of the female mold 42 from moving in any direction other than the longitudinal direction of the pins themselves. In one embodiment, there may be at least three pins 47. For example, the embodiment shown in FIG. 15 features six longitudinal pins 47.

The second part B of the female form 42 has the function to form one side surface of the bread, the particular side with the opening to the space within the bread. The part B has a flange 46B with holes 48 of appropriate diameter and location to receive therein the longitudinal pins 47 of part A. Extending upwardly from one end of flange 46B is a vertical plate 50 with an opening 51 whose perimeter mirrors the perimeter of the vertical plate 50. The distance between the perimeter of plate 50 and the opening 51 determines the eventual dough thickness prior to baking. This thickness can be altered to any specification requirement by making the opening 51 smaller or larger. The plate 50 may also have vent holes 52 to release excess dough. The opening 51 itself will have walls extending outwards to form a hollow tube-like structure 54 which in turn will serve as a guide to center and keep centered the male form 44 when it is assembled with the female mold 42.

The third part C of mold 42 has a flange 46C and a top or lid section 57, which serve to define or form the last four remaining surfaces of the bread loaf being produced. The flange 46C also has holes 48' to receive the upright pins 47 therein. The lid 57 has an entrance zone 56, configured to be in alignment with plate 50. The entrance zone 56 also has vent holes 52' matching with the vent holes 52 of the plate 50. The lid 57 may also have a handle 55. When all the parts of mold 42 are assembled together the entire exterior surface of the bread dough is defined.

The hollow male mold 44 is provide with a stop 58 such that when it is fully inserted into the female form 42, a volume with desired dimensions is formed for defined between molds 42 and 44. The stop 58 in FIG. 15 is the base of the male form 44, which being larger than the opening 51 prevents the male form 44 being pushed too far into female mold 42.

The parts of the male and female molds that are in contact with the dough may have non-stick coatings applied thereto. When the three parts A, B and C of the female form 42 are completely assembled, part C may be treated with a releasing agent (as an example oil spray) as needed.

In operation, a premeasured amount of dough is placed into the female form 42 via the opening 51, or it can be placed inside part C before part C is assembled in place with parts A and B. The male form 44 is then inserted to force the dough to be thoroughly distributed into the volume defined between forms 42 and 44. Excess dough will be expelled out through the vent holes 52, 52' and returned to the dough mix to be reused. Prior to baking, part C is removed and to facilitate its removal without damaging or changing the shape of the dough, releasing agents may be applied and used, or the dough may be frozen.

Figure 16:
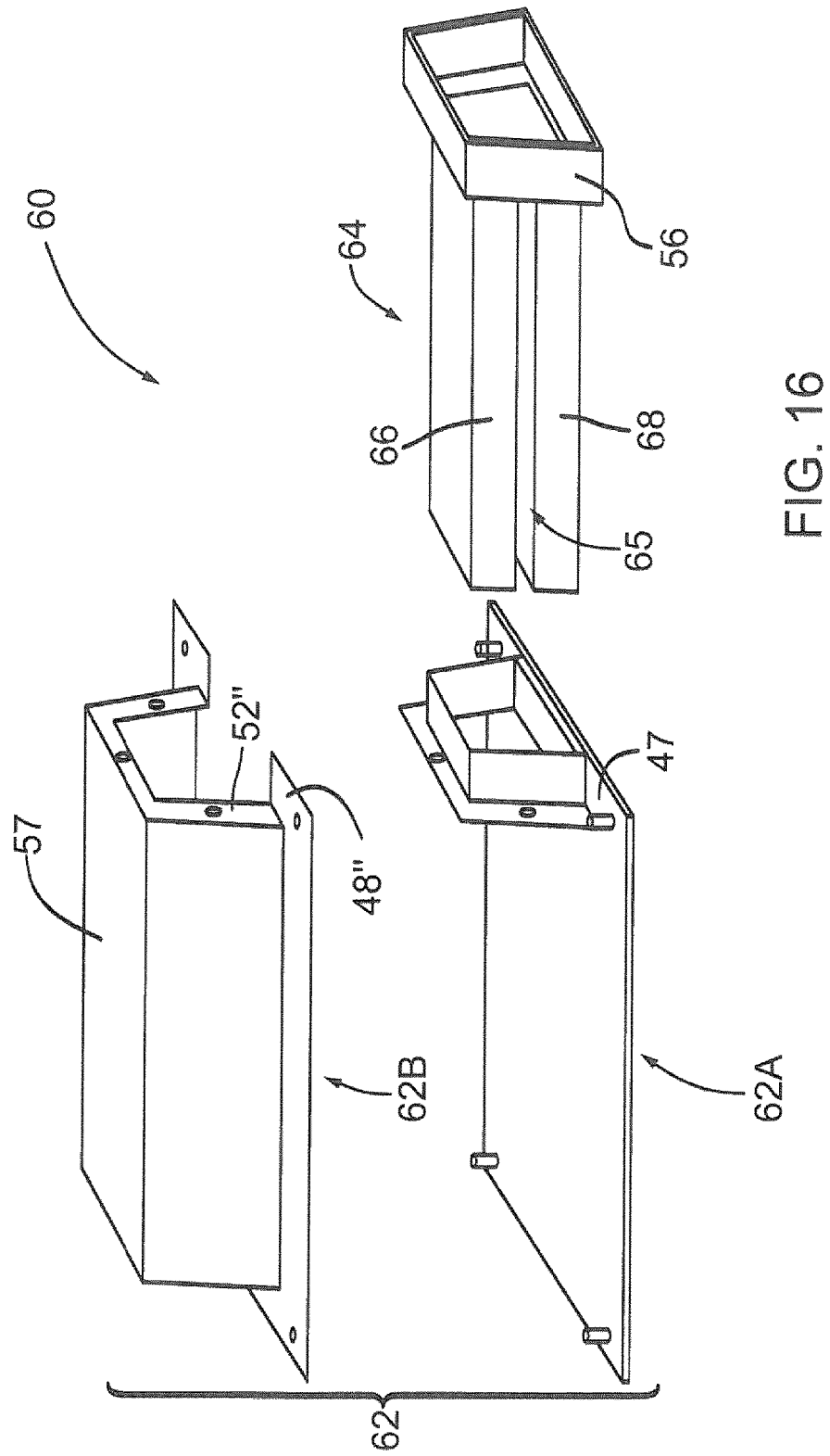
FIG. 16 is an exploded view of an apparatus according to a second alternative embodiment of the present disclosure.

Although the method described produces a single pocket, multi pocketed loaves can be made by using multiple male forms or using a single male form with multiple projections. One exemplary embodiment is shown in FIG. 16, where the apparatus for making multiple pocketed loaves is generally shown at 60. In this embodiment, the male mold 64 is similar to the male mold 44 shown in FIG. 15, except that it is divided into two compartments 66 and 68 with a volume or space 65 formed therebetween. The volume 65 in FIG. 19 extends all the way to the base or stop 58, thereby creating in essence two independent male forms, which provide the two separate compartments 66 and 68. In FIG. 16, the space 65 is shown in the horizontal position corresponding to the orientation of they assembled molds 42 and 44 in when in use, which would result in two separate pockets with one atop of the other in the final baked product. However, the male mold 44 may be configured so that the space 65 is in the vertical position and create two separate side by side pockets in the final baked product, if desired.

FIG. 16 also shows an alternate embodiment of a female mold 62 which includes part A and part B of mold 42 shown in FIG. 15 combined into a single unit. In this alternative embodiment, the female mold 62 has the first part 62A which forms the bottom surface and one side surface of the bread loaf, while the second part 62B forms the remaining four surfaces of the bread loaf. The first part 62A has a pre-selected number of longitudinal pins 47 extending upwardly, with all other remaining structure similar to that of the female mold 42 part B shown in FIG. 15. Likewise, the structure of the second part 62B is substantially similar to that of female mold part C shown in FIG. 15.

Figure 17:
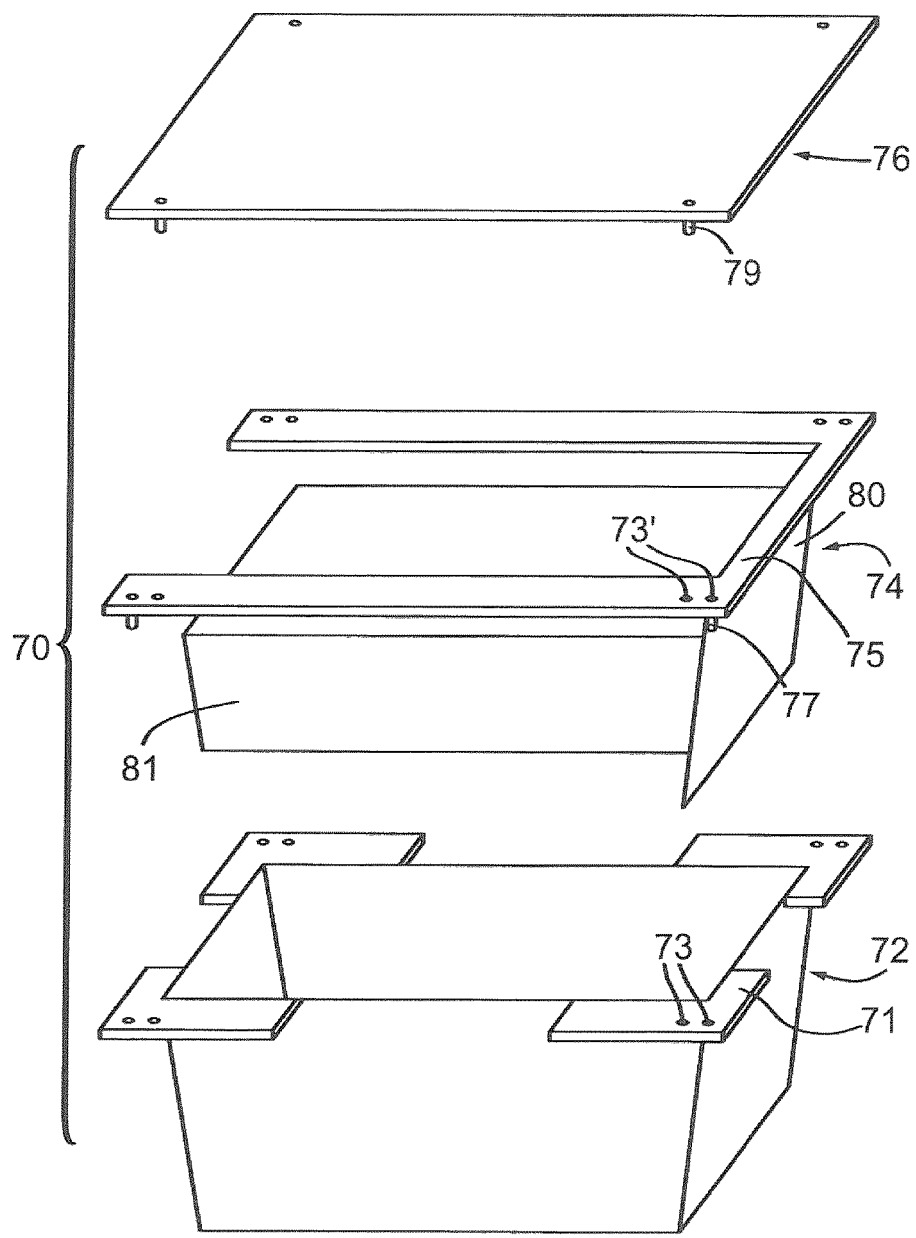
FIG. 17 is an exploded view of an apparatus according to a third alternative embodiment of the present disclosure.
Figure 18:
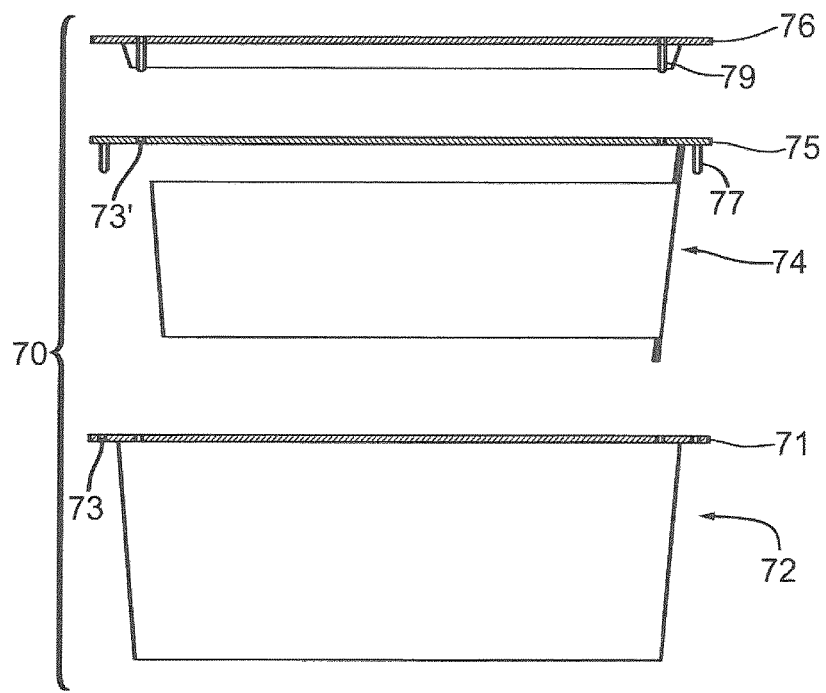
FIG. 18 is a side elevation view of the apparatus shown in FIG. 17.
Figure 19:
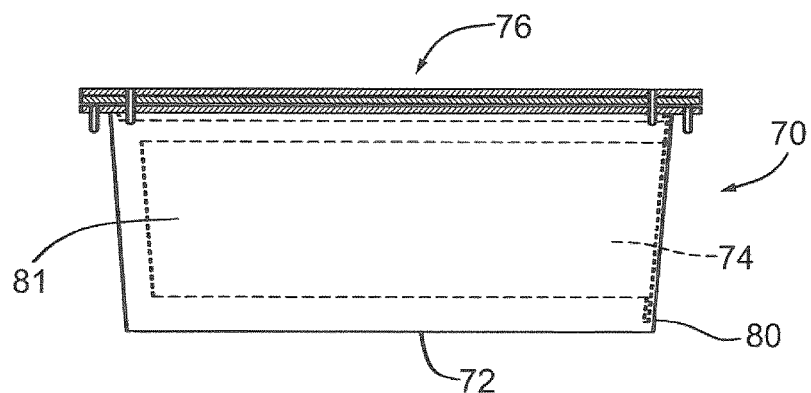
FIG. 19 is a side elevation view of the apparatus of FIG. 18, as assembled.

The present disclosure is also directed to another alternative embodiment of an apparatus for making any breads. Referring to FIGS. 17-19 the apparatus shown at 70 comprises a female baking mold 72, a male Insert 74, and an optional lid 76. A single unit is shown in FIGS. 17-19, but for economy multiple units could be strung together.

The female baking mold 72 has flange 71 to provide holes 73 for pins 77 on the male insert 74 and pins 79 on the optional lid 76. The flange 71 is notched to facilitate easier removal of the male Insert 74 and the lid 76. Handles may also be placed on the flange or rim of any of the parts of female baking mold 72, the male Insert 74 and the optional lid 76 to facilitate separation.

The male Insert 74 forms the specified volume within the dough and also determines the dough thickness. These dimensions can be adjusted by using detachable sleeves 81 over the male form 74 in FIG. 17. The detachable sleeve 81 is a larger male form which fits over the existing one to increase the size of the pocket and to decrease the thickness of the dough. The wall 80 in FIG. 17 supporting the male form can be smaller in dimension than the corresponding wall on the baking tray portion of female form 72 so that the baked product can be removed more easily. The flange 75 has pins 77 and holes 73' to accommodate female baking mold 72 and the lid 76.

The optional lid 76 acts to compress the dough to ensure it covers the male insert 74 completely. It may be vented to remove excess dough. It may also be indented to fit the opening of the baking tray of female form 72.

In operation, a pre-measured amount of dough is put into the female baking mold 72. Then, the male insert 74 is placed firmly over it, followed by the lid 76 if present.

In the case where the dough is high in viscosity, the female baking mold 72 may be under-filled prior to the placing of the male insert 74 into the female mold 72. Afterwards, more dough may be added and then the lid 76 may be used to compress the dough to ensure there is total coverage and that there is no empty space under the lid 76. Clips may be used on the flanges 71 and 75 to secure the molds 72 and 74 together firmly when needed. The lid 76 may be removed for the baking process or, if desired, the assembled molds may be flipped over and the female baking mold 72 removed instead, for the cooking process.

In the case the dough has a low viscosity, it could be placed into the baking tray 72 with the male insert 74 already in position. The use of the lid 76 for the cooking process is optional.

The method of baking using the molds disclosed herein may also be carried out by using other dough such as puff pastry dough or donut dough and even crepe batter may be used to make other products. Automation and using multiple forms would increase the cost effectiveness of the method.

A tool used for filling the female forms with dough may be provided which has almost the same cross sectional shape as the male molds but with slightly smaller dimensions to allow ease of insertion into the space. In addition, the tool may be open ended at both ends and have a top is made with two (2) hinges such that both sides can be opened to gain access to the interior to place the desired filling. The two flaps that determine the top when closed leave a space between them when closed which allows for the use of a matching spatula to close the exterior open end at the same time while withdrawing the tool, thus depositing the filling. Alternatively, the top could be left open without the flaps.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps, or components are included. These terms are not to be interpreted to exclude the presence of other features, steps, or components.

What is claimed is:

1. An apparatus for making an edible container, said apparatus comprising:
   at least one female mold having a hollow body and an entrance into said hollow body;

at least one male mold having a body with a first end portion adapted for insertion into the hollow body of the female mold and a second end located exterior to said hollow body when said first end portion is inserted into said hollow body, and an alignment and positioning mechanism for aligning said female mold and said male mold for assembling said female mold and said one male mold together;

wherein said at least one female mold comprises an L-shaped base having a bottom plate and a vertical end member with said entrance for lateral insertion of the male mold with said bottom plate including a peripheral edge, a top enclosure having a peripheral edge and being releasably attachable to the L-shaped base, said top enclosure having an inlet portion configured for alignment with said entrance of the vertical end member, wherein the L-shaped base and the top enclosure defines a cavity for lateral insertion of the male mold, and a space between the male mold and the female mold, when assembled, defines a wall thickness of the edible container produced; and said alignment and positioning mechanism including said peripheral edge of said L-shaped base having a plurality of alignment pins mounted thereon, and said peripheral edge of said top enclosure having a plurality of holes aligned with said plurality of alignment pins.

2. The apparatus according to claim 1 wherein the male mold is configured for lateral insertion into said cavity, and comprises a stop at a proximal end thereof.

3. The apparatus according to claim 2 wherein the male mold comprises at least two separate compartments for producing a multi-pocket baked product.

4. The apparatus according to claim 3 wherein the at least two separate compartments are formed by at least one groove on outer surfaces of the male mold, said groove extending in a vertical or horizontal position.

5. The apparatus according to claim 1 wherein the vertical end member further comprises a flange base releasably attached to the bottom plate, the flange base including a plurality of holes, wherein the plurality of alignment pins on the bottom plate pass through the plurality of holes of the flange, thereby providing releasable attachment.

6. The apparatus according to claim 1 wherein the vertical end member further comprises a hollow tube-like structure extending outwardly from the entrance, said tube-like structure centering the male mold when assembled with the female mold.

7. The apparatus according to claim 1 further comprising vent holes formed on the inlet portion of the top enclosure and/or on the vertical end member.

\* \* \* \* \*